No. 613,779. Patented Nov. 8, 1898.
C. ROSENFELD.
REFUSE CART.
(Application filed Feb. 16, 1898.)
(No Model.)
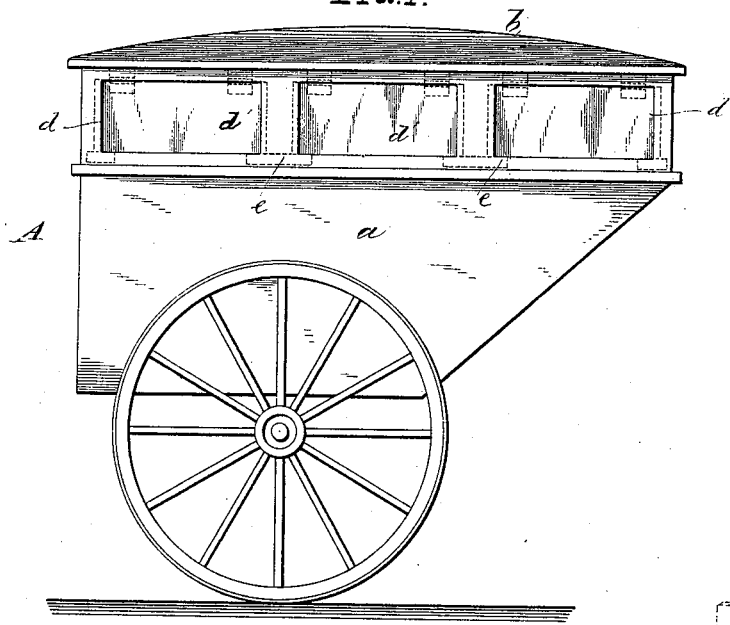
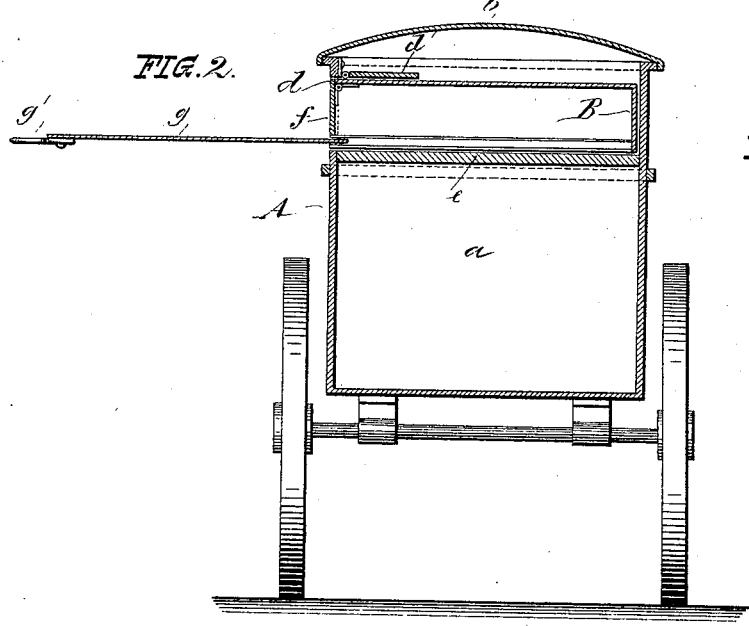
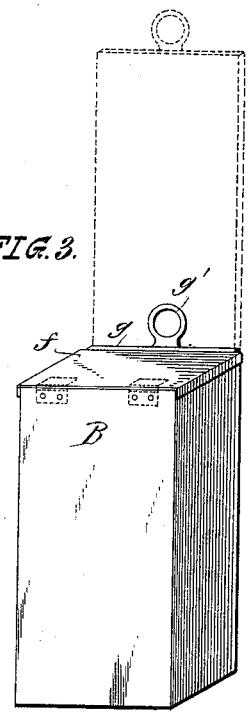
WITNESSES: INVENTOR

UNITED STATES PATENT OFFICE.

CARL ROSENFELD, OF NEW YORK, N. Y.

REFUSE-CART.

SPECIFICATION forming part of Letters Patent No. 613,779, dated November 8, 1898.

Application filed February 16, 1898. Serial No. 670,594. (No model.)

*To all whom it may concern:*

Be it known that I, CARL ROSENFELD, a citizen of Austria-Hungary, and a resident of New York, in the county and State of New York, have invented certain new and useful Improvements in Refuse-Carts, of which the following is a specification.

My invention has reference to improvements in refuse-carts, and has the object to provide a refuse-cart into which the ash and garbage pans or boxes can be emptied without producing dust and bad smell, which is the case with the carts of that kind at present in use. These carts have a body open at the top into which the contents of the ash and garbage pans or boxes are shed, which is not alone of great annoyance to the persons passing the streets, but also detrimental to health, as the noxious effluvia contained in the refuse are allowed to escape and infect the air.

My improved refuse-cart, which has the purpose to do away with the said disadvantages, is illustrated in the accompanying drawings, in which—

Figure 1 is a front view of the same; Fig. 2, a vertical section of Fig. 1, and Fig. 3 a detail showing the construction of the ash pan or box used with the refuse-cart.

Similar letters of reference indicate corresponding parts.

A in the drawings represents a cart, and *a* the body of the same. The body is provided with a hinged top cover *b*, and has immediately below the top one or more side openings *d*, which are provided with inwardly-swinging lids *d'*, hinged to the upper edges of the said openings. The hinges of the said lids are preferably spring-acting, so that the lids are pressed against the edges of the openings and automatically close the same when they are at rest. Between the openings *d* and below the same horizontal bars *e* traverse the body and are attached to the inside of the body. These bars project laterally somewhat beyond the side edges of the openings *d*, so as to serve as guiding-supports for the ash pans or boxes to be pushed into the said openings and emptied into the body of the cart.

B shows the ash and garbage pan or box used with the described refuse-cart. This pan or box has preferably an oblong shape and is closed by a hinged covering-plate *f*. One of the side walls *g* is removable and slides in guide-grooves. This removable side wall serves to remove the contents from the pan or box by drawing the side wall out and allowing the contents to drop through the opening thus produced.

The ash and garbage pans or boxes are distributed in the dwellings and filled with the household refuse, which is collected by cart-drivers or other attendants in the usual way.

The contents of the pans or boxes are discharged into the carts as follows: The full pan or box is pushed against the lid *d'* and the opening *d* thereby released from the lid. The pan or box, with the sliding wall *g* downward, is pushed into the opening *d* (the bars *e* serving as guiding-supports) until the cover-plate of the pan or box is in line with the side wall of the cart-body and the side opening closed. It is to be understood that the openings and pans or boxes correspond in shape. Then the sliding wall *g* is taken hold of by the handle *g'* and drawn out and the refuse thereby discharged from the pan or box into the cart-body without allowing any dust or bad smell to escape into the free air. The sliding wall is then pushed back and the closed pan or box withdrawn from the cart-body. As soon as the lid *d'* is released from the pan or box it will swing downward and automatically close the opening *d*, so that the contents of the cart are not accessible without opening the top cover *b*. The cart is emptied by dumping the same and opening the top of its body, as is the case with the carts of that kind at present in use.

Having thus described my invention, I claim as new and desire to secure by Letters Patent—

1. In a refuse-cart, the combination of a cart-body having beneath its top side openings closed by inwardly-swinging lids and provided with traversing supporting-bars, with removable pans or boxes having each a sliding side wall and fitting into the said side openings of the body in which they are held in place by the said traversing bars, substantially as set forth.

2. In a refuse-cart, the combination of a cart-body having beneath its hinged top cover side openings closed by inwardly-swinging lids and with traversing guide-bars between the said openings, with removable pans or boxes having each a sliding wall and fitting into the said openings in which they are supported by the traversing guide-bars, substantially as set forth.

CARL ROSENFELD.

Witnesses:
HENRY ROSENBERG,
LUDWIG WOLFF.